United States Patent
Honda et al.

(10) Patent No.: US 11,763,446 B2
(45) Date of Patent: Sep. 19, 2023

(54) WAFER BIN MAP BASED ROOT CAUSE ANALYSIS

(71) Applicant: PDF Solutions, Inc., Santa Clara, CA (US)

(72) Inventors: Tomonori Honda, Santa Clara, CA (US); Lin Lee Cheong, San Jose, CA (US); Richard Burch, McKinney, TX (US); Qing Zhu, Rowlett, TX (US); Jeffrey Drue David, San Jose, CA (US); Michael Keleher, Seattle, WA (US)

(73) Assignee: PDF Solutions, Inc., Santa Clara, CA (US)

( * ) Notice: Subject to any disclaimer, the term of this patent is extended or adjusted under 35 U.S.C. 154(b) by 329 days.

(21) Appl. No.: 17/246,397

(22) Filed: Apr. 30, 2021

(65) Prior Publication Data

US 2021/0342993 A1    Nov. 4, 2021

Related U.S. Application Data

(60) Provisional application No. 63/018,884, filed on May 1, 2020.

(51) Int. Cl.
*G06V 10/74* (2022.01)
*G06T 7/00* (2017.01)
*G06F 11/07* (2006.01)

(52) U.S. Cl.
CPC ............ *G06T 7/001* (2013.01); *G06F 11/079* (2013.01); *G06T 2207/30148* (2013.01)

(58) Field of Classification Search
CPC .............. G01R 1/07342; G01R 31/306; G01R 31/2653; G06T 7/001; G06T 2207/30148; G06F 11/079; H01J 37/3175; H01J 37/3005
USPC ......................................................... 382/309
See application file for complete search history.

(56) References Cited

U.S. PATENT DOCUMENTS

| | | | |
|---|---|---|---|
| 5,240,866 A | 8/1993 | Friedman | |
| 5,787,190 A | 7/1998 | Peng | |
| 2005/0065739 A1 | 3/2005 | Knoch | |
| 2008/0250384 A1* | 10/2008 | Duffy | .................. G03F 7/70525 716/55 |

(Continued)

FOREIGN PATENT DOCUMENTS

TW    1431706    3/2014

OTHER PUBLICATIONS

Chien et al. "Data mining for yield enhancement in semiconductor manuracturing and an empirical study." Expert Systems with Applications 33.1 (2007): 192-198. Jul. 2007 (Jul. 2007) Retrieved on Jun. 28, 2021 (Jun. 28, 2021) from <https://www.sciencedirect.com/science/article/abs/pii/S095741740600131X>.

(Continued)

*Primary Examiner* — Phuoc H Doan
(74) *Attorney, Agent, or Firm* — Dergosits & Noah LLP

(57) ABSTRACT

A template for assigning the most probable root causes for wafer defects. The bin map data for a subject wafer can be compared with bin map data for prior wafers to find wafers with similar issues. A probability can be determined as to whether the same root cause should be applied to the subject wafer, and if so, the wafer can be labeled with that root cause accordingly.

20 Claims, 13 Drawing Sheets

(56) References Cited

U.S. PATENT DOCUMENTS

2010/0057391 A1    3/2010  St. Pierre
2020/0134809 A1*  4/2020  Moioli .................. G06T 7/0004

OTHER PUBLICATIONS

International Search Report and Written Opinion of the ISA dated Aug. 5, 2021.

* cited by examiner

WAFER BIN MAP BASED ROOT CAUSE ANALYSIS

CROSS REFERENCE

This application claims priority from U.S. Provisional Application No. 63/018,884 entitled Improving Root Cause Analysis using Active Learning Frameworks, filed May 1, 2020, and incorporated herein by reference in its entirety.

TECHNICAL FIELD

This application relates to semiconductor manufacturing processes, and more particularly, to systems and methods for classifying images from semiconductor manufacturing processes in order to identify the root cause of wafer defects.

BACKGROUND

It is desirable yet difficult to classify wafers and assign labels for all wafer issues and to identify related root causes for wafer defects in a semiconductor manufacturing process. The classification and assignment of labels occurs at a wafer sort step conducted after fabrication by performing multiple electrical tests on individual chips on the wafer. The test results are typically represented as categorical values for all chips, thus forming a spatial map called a wafer bin map. Different defect patterns may be evident from the wafer bin maps, and for each defect pattern, it is important to identify the root causes of process faults that led to the particular defect so that the problem may be corrected. The present disclosure is directed to improved methods for doing so.

DETAILED DESCRIPTION

This disclosure is directed to methods and systems for generating and providing a template as a graphical user interface ("GUI") for wafer map based analysis to assist users with identifying important "key" wafers for labeling of defects and associated root causes from a semiconductor manufacturing process.

The GUI is a processor-based tool that provides a visual display of information in a formatted manner, with widgets of various design for enabling user interaction with at least the displayed information, and for providing control functions, all as generally known. Combined with the use of machine learning algorithms, the template benefits from user input in a collaborative manner to improve predictive capability.

The processor could be desktop-based, i.e., standalone, or part of a networked system; but given the heavy loads of information to be processed and interactively displayed, processor capabilities (CPU, RAM, etc.) should be current state-of-the-art to maximize effectiveness. In the semiconductor foundry environment, the Exensio® analytics platform is a useful choice for building GUI templates. In one embodiment, coding of the underlying processing routines may be done using Spotfire® analytics software version 7.11 or above, which is compatible with Python object-oriented programming language, used primarily for coding machine language models.

In the present application, for incoming wafers that have been labelled as abnormal, the GUI-based template should be provided with the following functionality:

(i) Compare the data for the incoming wafer(s) with retrieved data for existing wafers. The comparison to existing wafer data should be specific to the product flow for the incoming wafer(s), ensuring that the most relevant data is retrieved and compared.

(ii) Label the incoming wafer with the most likely root causes (e.g., a process module or a process step) that are associated with the bin pattern for the incoming wafer(s), or lack thereof.

(iii) Display basic information about the incoming wafer, such as individual wafer identification (WaferID), lot number, etc.

(iv) Drill down into the data to analyze the abnormal neighbors of the incoming wafer(s) including die map, clusters, zone statistics, comments provided by users, etc.

(v) Override and update the listed dominant and secondary root-cause, such as a process step or process module.

(vi) Save the updated results to be used for comparison and labeling of future incoming wafer(s).

In order to reduce the burden for generating a label, the Active Learning Framework may be utilized to identify key wafers for labeling. The key wafers could include (i) wafers that model uncertainty by looking at each individual wafer, and (ii) wafers that improve the overall confidence of model, such as an unlabeled wafer that is actually closest to wafers in the test set.

Figure 1:
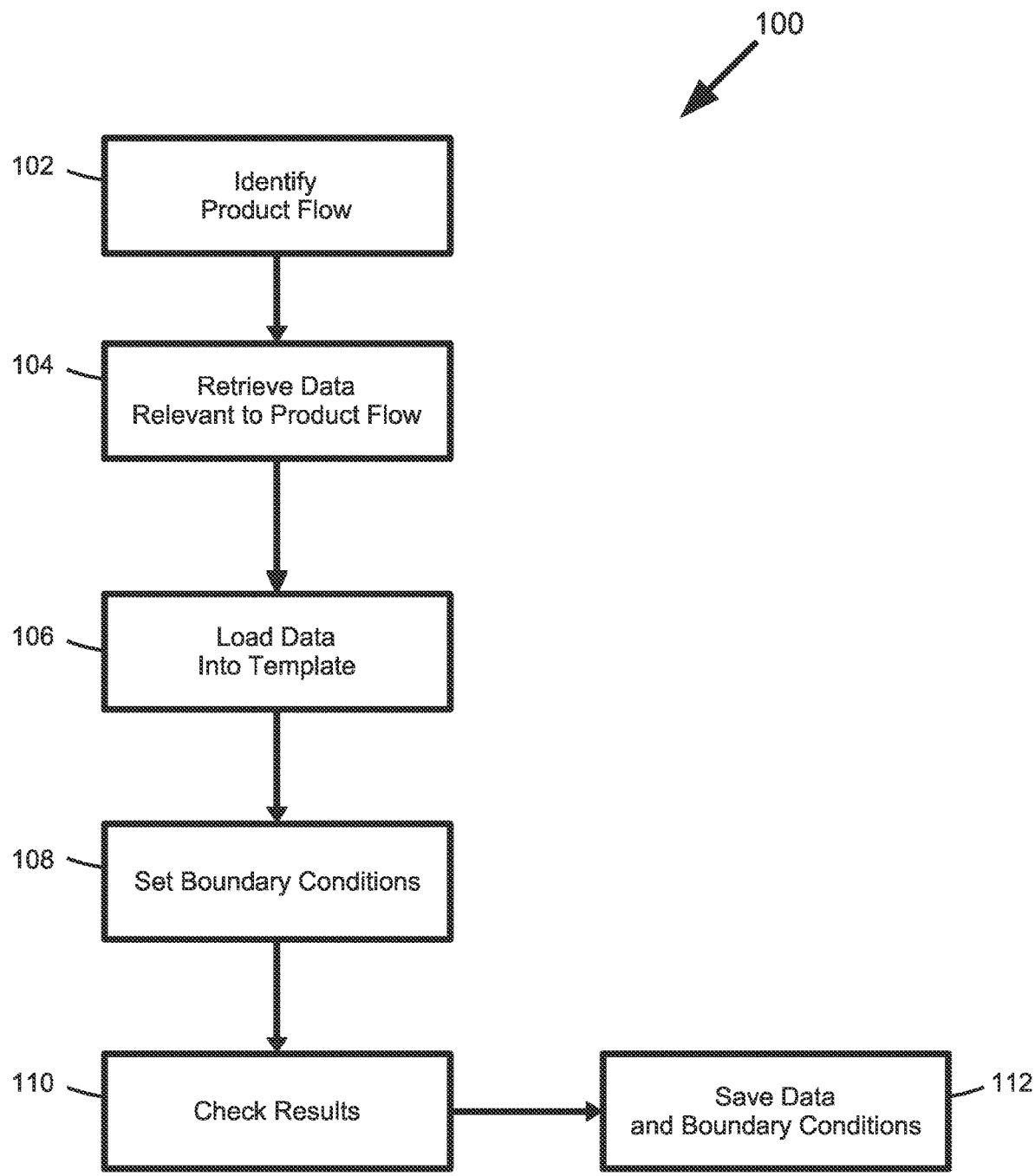
FIG. 1 is a flow chart illustrating a high-level process for implementing a template for analyzing wafer maps.

Referring to FIG. 1, a high-level process 100 for implementing the template for wafer map based analysis is illustrated. In step 102, the relevant product flow is identified, then an existing set of wafer data for the relevant product flow is retrieved from one or more databases in step 104 and loaded as input into the template in step 106. By product flow, we mean the combination of process steps and/or process modules that are performed for this particular product type or product family (ProductID) of incoming wafer sample(s). Thus, during a production run, many wafers, each having a unique WaferID, are produced in different lots for a particular ProductID. A static process produces only a single product type, whereas a dynamic process changes steps and/or modules to produce different product types.

The boundary conditions or parameter cutoffs for this product flow are identified in step 108, and may be set manually or automatically, as discussed below. In step 110, the user reviews the results to provide a sanity check that the results make sense. Finally, the wafer data and boundary conditions are saved to a database in step 112 to be available for future comparisons.

In use, the template is set up to obtain as input preexisting customer wafer data, for example, from accessing the one or more databases that store the customer wafer data from previous production runs. The general principle is that the prior wafer bin map data can provide an effective comparison to determine that the current incoming wafer has the same issues, or that it has no issues. However, if the size of the chip is significantly different, then the wafer map will also be significantly different, and the described approach may not work as well. Thus, the analysis may ordinarily be limited to the same or similar product.

The following types of information, or a subset thereof, are ordinarily stored in one or more databases and available to be loaded into the template as inputs in step 106:

(i) A table having a list of prior wafers including known and verified primary and secondary root cause(s) for respective wafer issues/defects.

(ii) The wafer equipment history (WEH), metrology data, indicators for failure detection and classification (FDC), and other relevant wafer manufacturing data for the past wafers (not available for a fabless customer). If the past wafers are from a static fabrication process, i.e., a dedicated process path, such as A→→→B→C→D for a single product type, then the WEH includes the history of the processes and tools for that product type. If the past wafers are from a dynamic fabrication process, i.e., different types of product can be made with different process steps and/or process modules, then the WEH includes the history of processes and tools for a given WaferID as well as the product type.

(iii) For each WaferID, the wafer bin data per die, and the associated x-coordinates (Diex) and y-coordinates (Diey). The result of each die test is recorded by a technician and includes the problem with the die, such as current leakage, etc. The wafer level root cause is initially provided by an expert in the subject matter given the die failure pattern within the wafer. The different root causes for various wafer defects are encoded by the subject matter expert as wafer bins, each bin being used to collect and store wafer data for the same defect and root cause(s). A modern fabrication operation may have hundreds or even thousands of different wafer bins, with similar defects in different bins often being grouped together for ease of retrieval and analysis.

(iv) For each WaferID, outputs such as the Automatic Signature Classification (ASC), including zonal bin deltas from zonal medians for each wafer bin type (numeric), as well as the general pattern label (categorical) and detail patterns (categorical). For example, statistics may be calculated to determine where the defect appears in different spatial zones of the wafer. As an example, it may be determined that a significant percentage of defects in the center zone are classified into bin A, and other smaller percentages are classified into bin B, bin C, etc. Thus, the statistics say that a defect in the center of the wafer bin map has a significant likelihood of being classified into bin A, and the wafer can be labeled with a general pattern label, such as "center issue only" as well as more descriptive pattern details, such "Full Bulls Eye," "Top Right 1Q Edge" and "Left Half Edge" as examples.

For each WaferID, the clustering of outputs, including identifying the presence of each statistically significant cluster with a central Diex, Diey location of the cluster (numeric), the bounding box of the cluster, and all Diex, Diey locations within the cluster. This tells us the size and continuous shape (circular, crescent moon, etc.) of a defect cluster.

When the user chooses to set the boundary conditions manually in step 108, the following parameters should be defined:

dc is the distance between the incoming wafer and neighboring wafers measured in number of die that is deemed close enough to label the incoming wafer(s) identical, and any differences between the wafers can be attributed to random noise;

df is the distance between the incoming wafer and neighboring wafers measured in number of die that is deemed too far away such that there is no similarity in the wafer bin cluster and the training set. Any overlap should be considered merely as random chance;

k is the number of neighbors considered by an algorithmic solution, such as the k-nearest neighbors (KNN) algorithm; and D is the metric used to calculate distance. A number of known distance metrics could be used, including the Euclidean distance metric, the Minkowski space tensor, the Mahalanobis distance metric, L1, L∞, etc.

Figure 2:
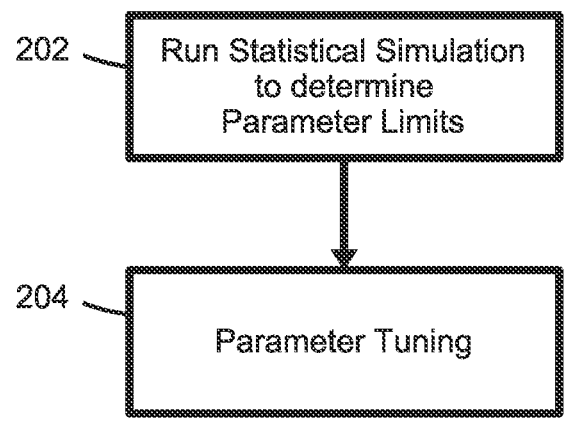
FIG. 2 is a flow chart illustrating a process for setting boundary conditions for relevant wafer parameters.

Automatic setting of the boundary conditions set in step 108 is illustrated as simple process 200 shown in FIG. 2. In step 210, a statistical simulation is run to find the parameter limits, and in step 220 the limits are tuned.

In the statistical simulation, each df and dc should be a function of the particular wafer map and the associated defect density. These df and dc parameters can be estimated, for example, using a Monte Carlo simulation, varying the amount of defects on a wafer, and fitting the simulated results using a Response Surface Methodology (RSM). The dominant signal resulting from the simulation will be used to determine the primary root cause and the secondary signal will be used to determine one or more secondary root causes.

Hyper parameter tuning is then applied, for example, by using n-fold cross validation on the simulation results based on labels that have been determined by a subject matter expert for the wafer issues in order to identify the best k parameter to apply to the dataset. A different D metric may be used or relevant for different wafer issues, or different die size, or different inputs, and could be determined on the basis of empirical results to select and apply that which works best for a particular application.

The parameters are saved and can be applied when new wafers come in for analysis. Note that each label type is considered independent, i.e., one k-parameter is derived for each process module, chamber ID, tool and process step.

Figure 3A:
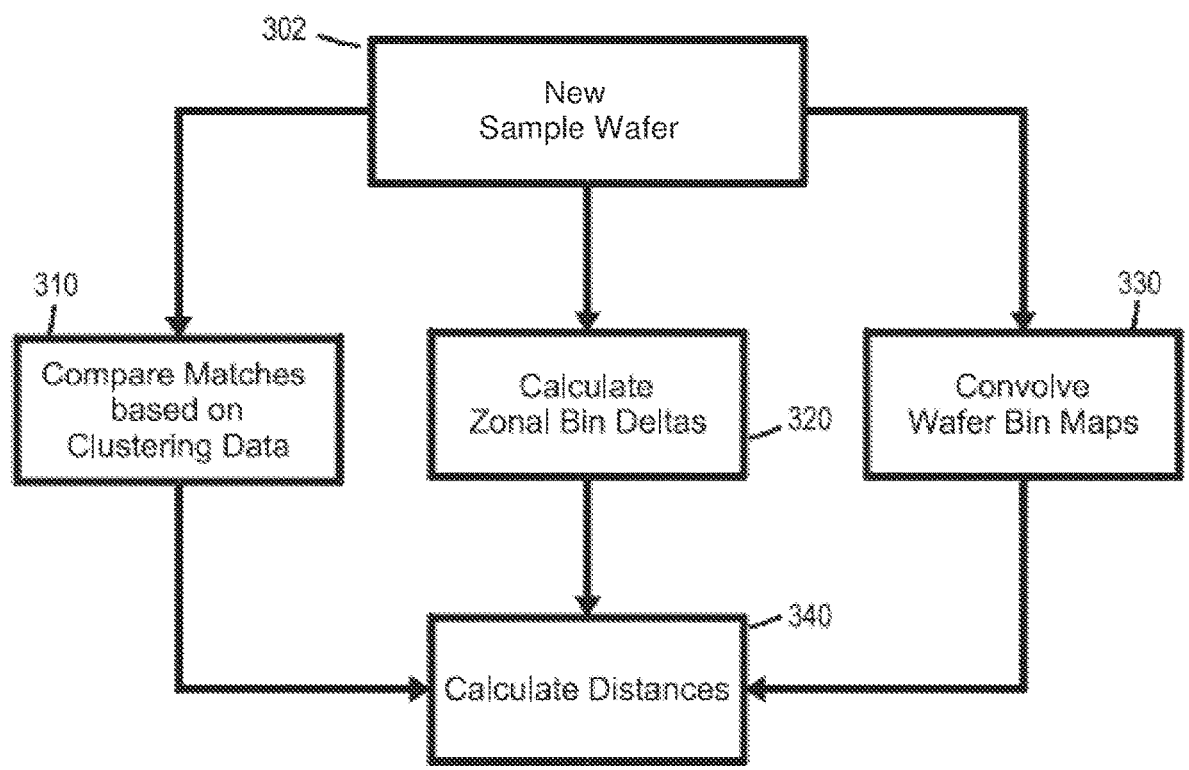
FIGS. 3A and 3B are flow charts illustrating a process for labeling wafers with root causes.
Figure 3B:
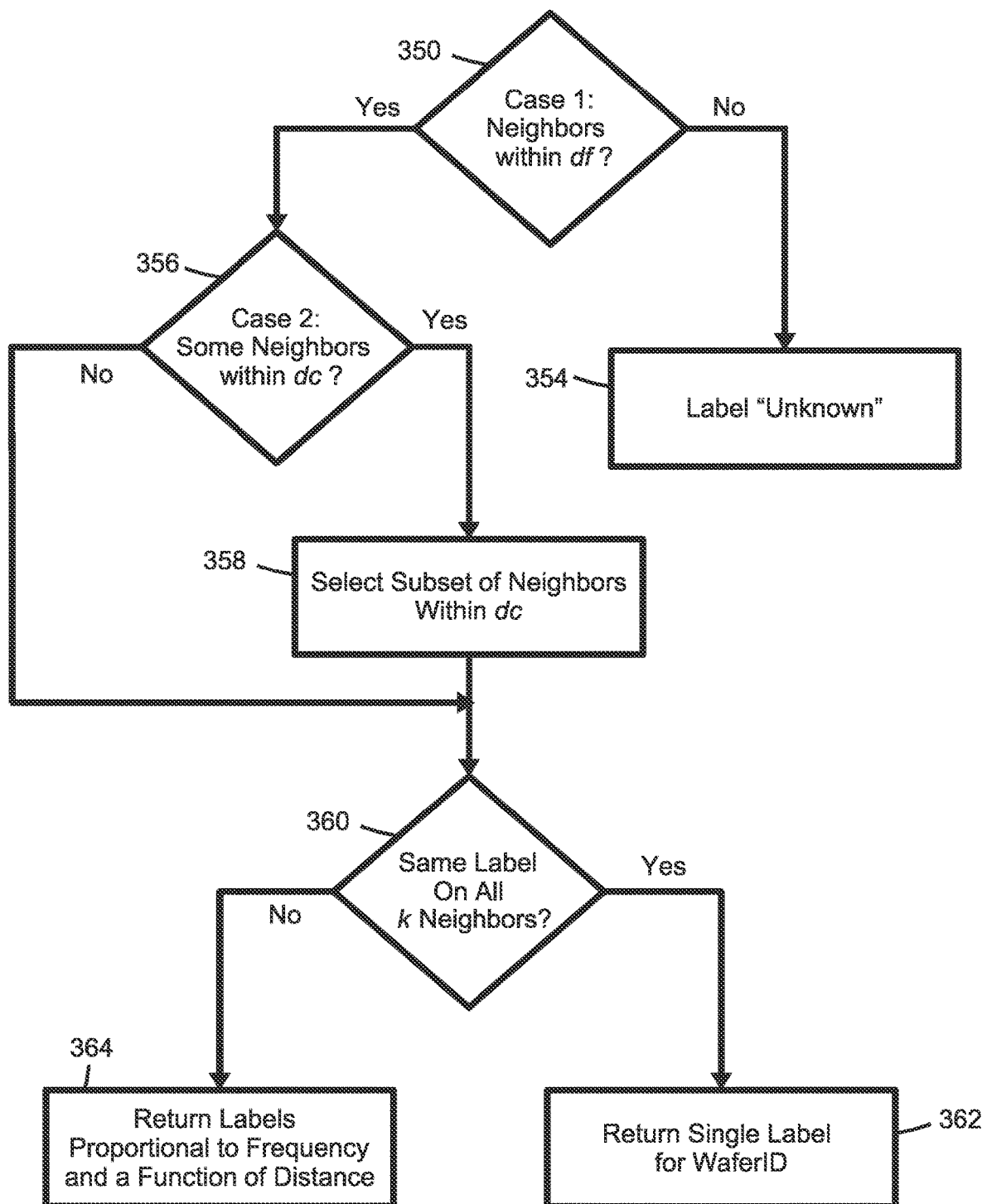

Referring now to FIG. 3A, three different and alternative approaches are presented for implementing an engine for analyzing wafer maps and predicting root cause for a new sample wafer received in step 302. In the first approach, a die cluster is computed for the sample wafer in step 310. In the second approach, step 320, zonal bin deltas are calculated. In the third approach, wafer maps are convolved in step 310. Each of the three approaches then proceeds to step 340, where distances are computed from the new wafer to all prior wafers having a known root cause, preferably using several different methods to compute distances.

The analysis proceeds to consider in step 350 whether there are any neighbors within distance df of the sample wafer. If not, then in step 354, the wafer issue is labeled as "unknown."

If there are neighbors within distance df of the sample wafer in step 302, then the next case to consider is whether at least some neighbors are within distance dc of the sample wafer in step 356. If so, then in step 358, a subset of k neighbors is selected and will generally be weighted equally in the prediction engine. The next inquiry in step 360 is whether all k neighbors in the subset have the same label. If so, then that label is returned as a single label in step 362 for that WaferID. If not, then in step 364, labels may be returned in proportion to their frequency and as a function of distance, for example.

In each of the different approaches, the prediction engine can be implemented in a number of different ways, such as a collaborative filter or a type of classification algorithm such as a spatial K-Nearest Neighbor (KNN) algorithm, a convolutional neural network (CNN), Random Forest, XGBoost, etc. It may be possible to combine the different approaches to labeling, such as using an ensemble approach including but not limited to majority vote and boosted decision tree.

In one embodiment, the stored knowledge and patterns may be transferred from one product to another by rescaling the bin maps, although using too large a scaling factor may produce errors. However, rescaling should be limited to manufacturing processes for similar products, e.g., it may not be practical to utilize a knowledge base for a 3D NAND flash memory to predict the root cause for CPU chips. Additionally, the bin code for each product should be standardized such that bin XYZ for product A is similar to bin XYZ for product B.

Figure 4:
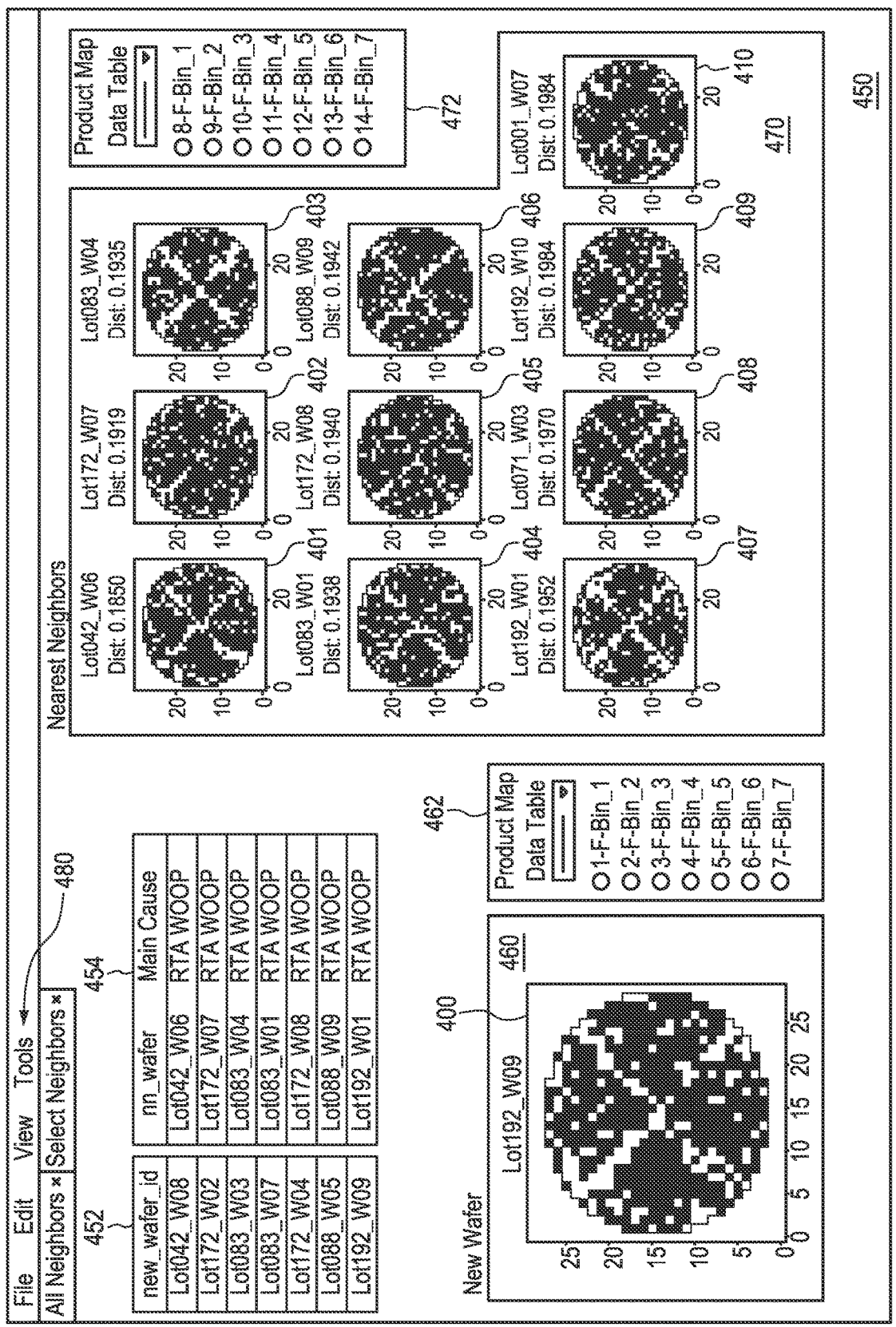
FIGS. 4-6 are user interface examples of a wafer bin map for a subject wafer being compared to wafer bin maps from prior production runs and viewed in a template configured to illustrate the determination of root cause using a nearest neighbor algorithm.
Figure 5:
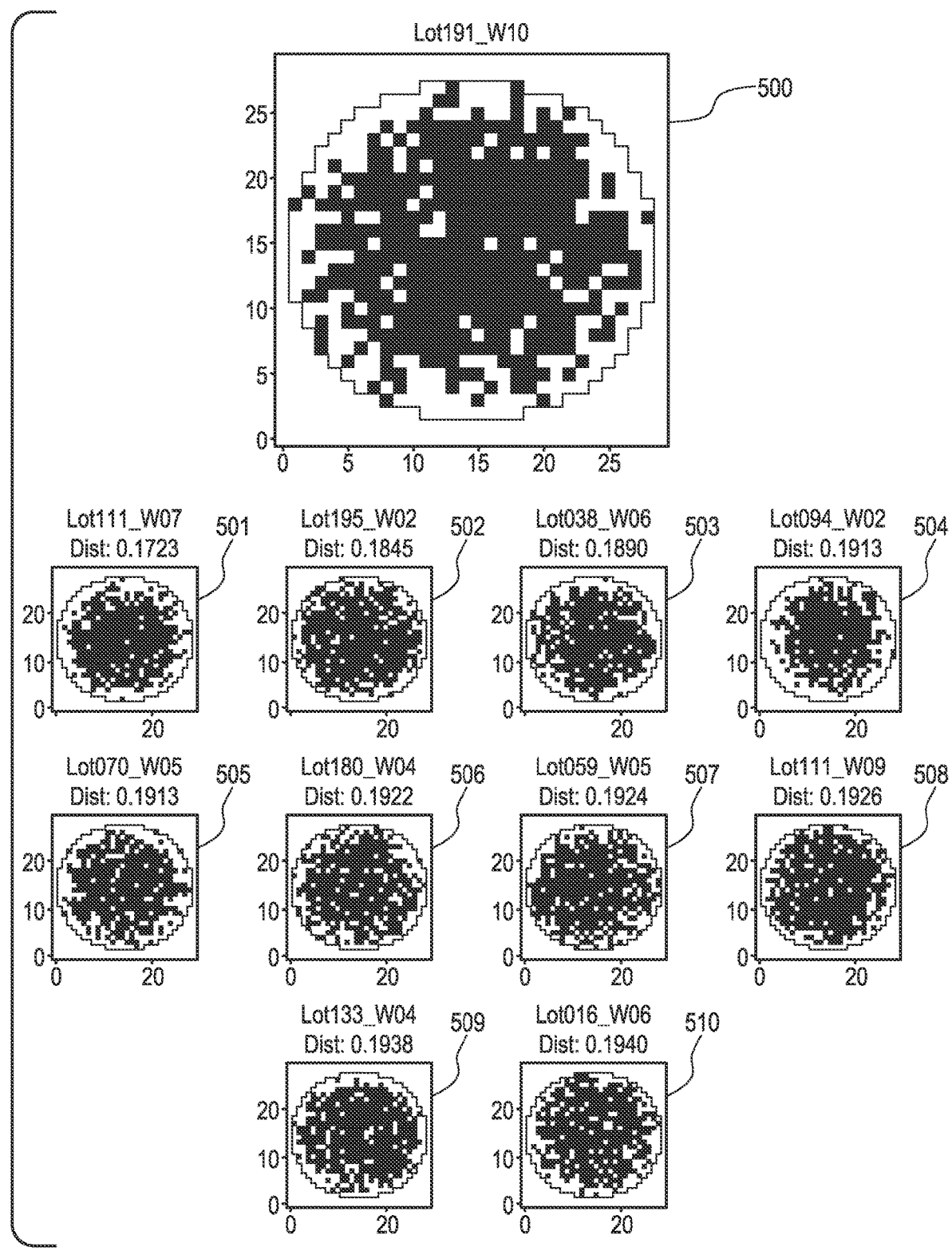
Figure 6:
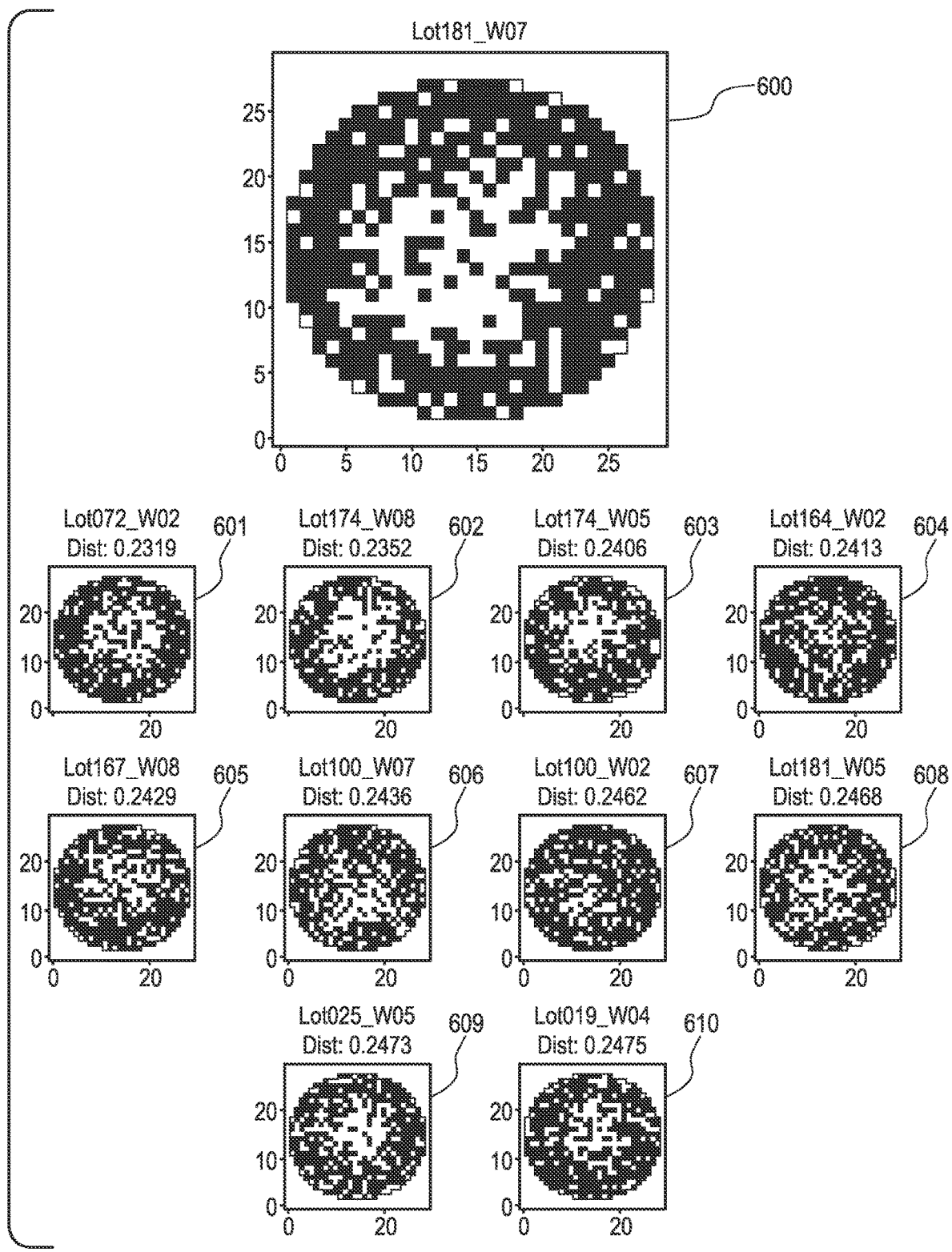

The output of the root cause analysis to the user GUI could take different forms. For example, in one form, the view shows the bin map for the incoming wafer and the closest neighbor wafers in the database, and identifies the root cause for those most similar neighbors, as well as the predicted most likely root cause for the subject incoming wafer. FIGS. 4-6 show examples of the GUI presentation for root cause analysis using the nearest neighbors approach.

In FIG. 4, a user interface 450 includes first window 460 displaying a new bin map 400 for a first incoming wafer shown with the wafer lot number and axes indicating distance measured as number of die. Below bin map 400 is a second window 470 displaying the ten closest bin map matches 401-410 from the database of prior data based on image analysis, with lot numbers and axes, but also listing a statistical distance of the neighbor from the subject bin map. In this example, the three bin maps 401, 403 and 405 are all identified with issue root cause A, and since root cause A is the largest common root cause, there is a good probability that the incoming wafer has the same root cause. Thus, a label with root cause A is also assigned to bin map 400 and the corresponding wafer.

User controls and other data are included in a typical GUI implementation, and some examples are shown in FIG. 4. Other wafer map GUIs would include similar features. For example, common system controls 480 such as File, Edit, View, Tools, are included in a ribbon or task bar at the top of GUI 450. The first window 460 includes a panel 462 describing a product map for the new wafer that the user can select or drill down on any listed item. The second window 470 includes a similar panel 472 describing a product map for the prior wafers that the user can select or drill down on any listed item. A third window 452 lists neighbor wafers that are similar to the new wafer, and a fourth window 454 lists the primary and second root causes for the similar neighbor wafers. It is noted that optional drill-down capability can be provided directly from a wafer map or from other panels or listing of the wafers, typically linking to one or more pages having more detailed wafer information, such as WEH, FDC indicators, metrology, etc.

Similarly, in FIG. 5, a new bin map 500 for a second incoming wafer is shown with the wafer lot number and axes, and below the bin map are the ten closest bin map matches 501-510 from the database, with neighbor statistical distances listed. In this instance, six of the ten prior bin maps, namely 501-505 and 509, all have issue root cause B, indicating a high probability that bin map 500 also has root cause B, and a label with root cause B is assigned to bin map 500 and the corresponding wafer.

FIG. 6 shows a new bin map 600 for a third incoming wafer with the wafer lot number and axes, and below the bin map are the ten closest bin map matches 601-610 from the database with neighbor statistical distances listed. Although initially an unknown pattern, five of the closest prior bin maps, namely 601, 602, 605, 608 have issue root cause C, therefore, based on the probability, a label with root cause C is assigned to bin map 600 and the corresponding wafer.

Figure 7:
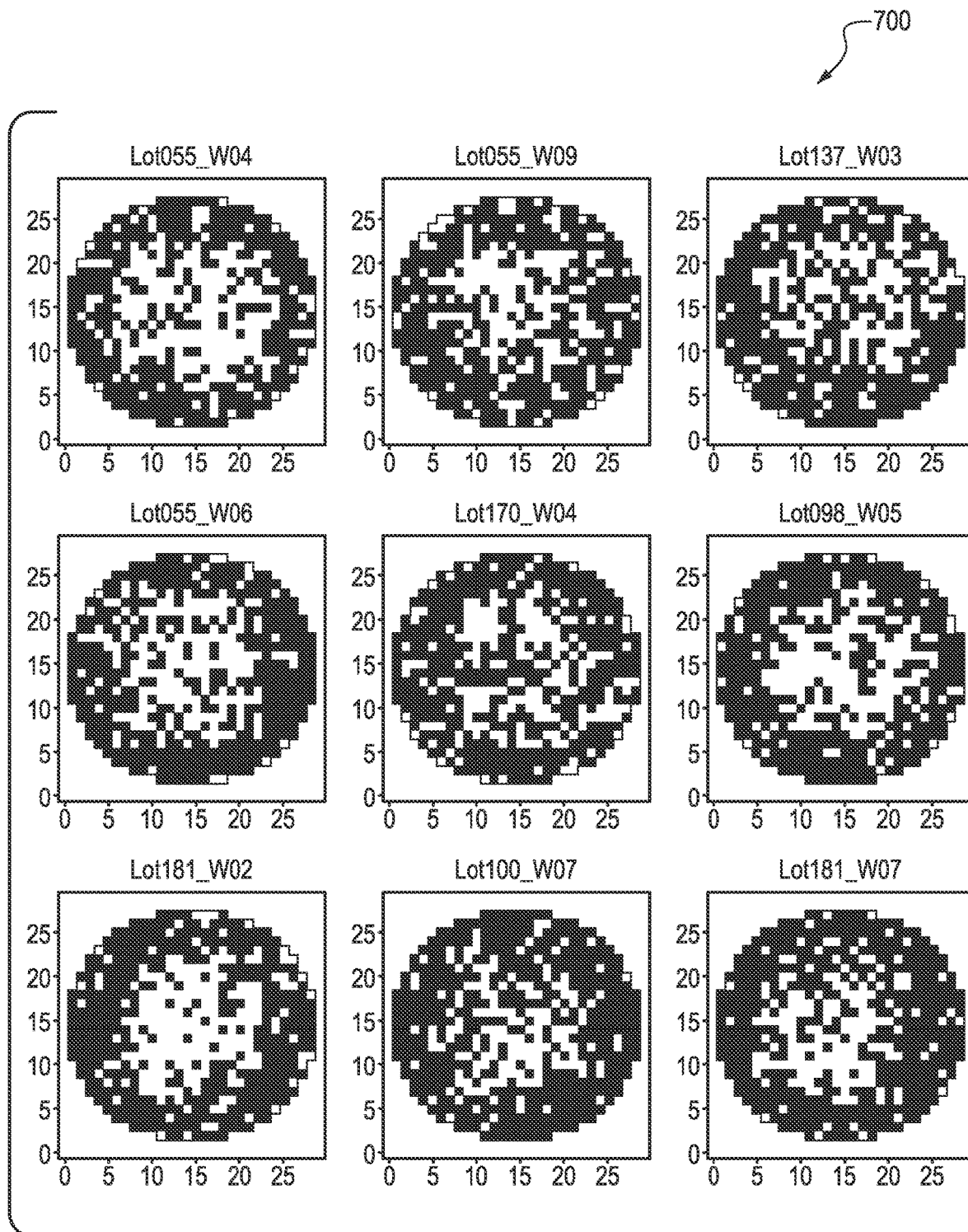
FIGS. 7-8 are user interface examples of wafer bin maps from prior production runs being viewed in a template configured to determine root cause using a cluster generation algorithm.
Figure 8:
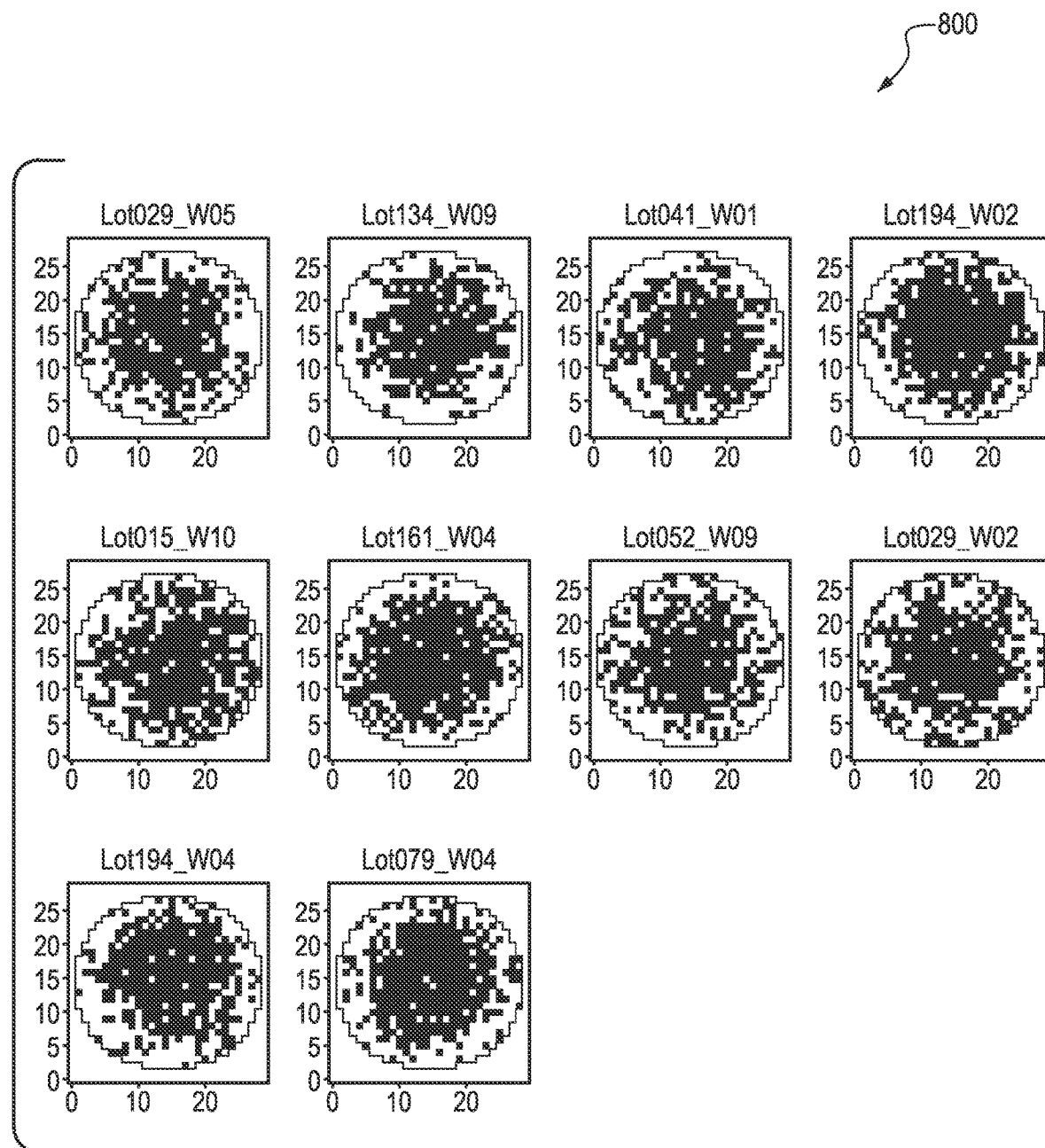

Another output form is cluster generation, which groups together sets of prior bin maps that are considered similar. Thus, the subject incoming bin map is compared to groups or clusters of bin maps rather than individual bin maps. For example, FIG. 7 shows a first set of bin maps 700 each having a defect clustered in the center of the bin map. FIG. 8 shows a second set of bin maps 800 each having a defect concentrated on the edge of the respective bin map. Thus, before comparing to individual prior bin maps, a rough sorting can be performed by comparing the incoming bin map to a generalized group, such as the center defects in FIG. 7 or the edge defects in FIG. 8. If all the wafers within a cluster have the same known root cause, then the wafers have a higher chance of having the same root cause. If the wafers within a cluster have different root causes, then WEH, FDC Indicators, and Metrology data may be needed to help with the analysis.

Figure 9:
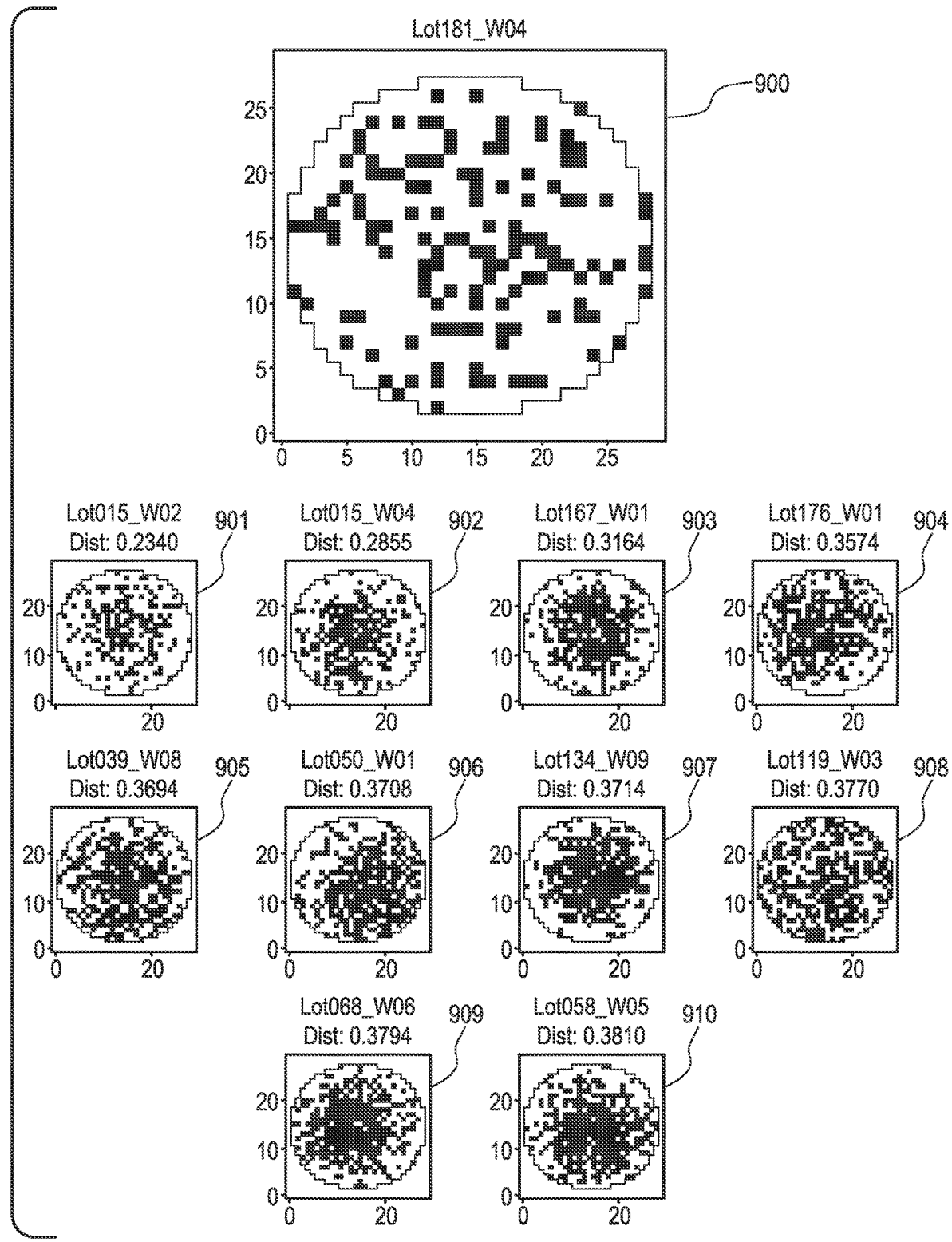
FIGS. 9-10 are user interface examples of wafer bin maps being viewed in a template configured to determine outliers having an unknown root cause.
Figure 10:
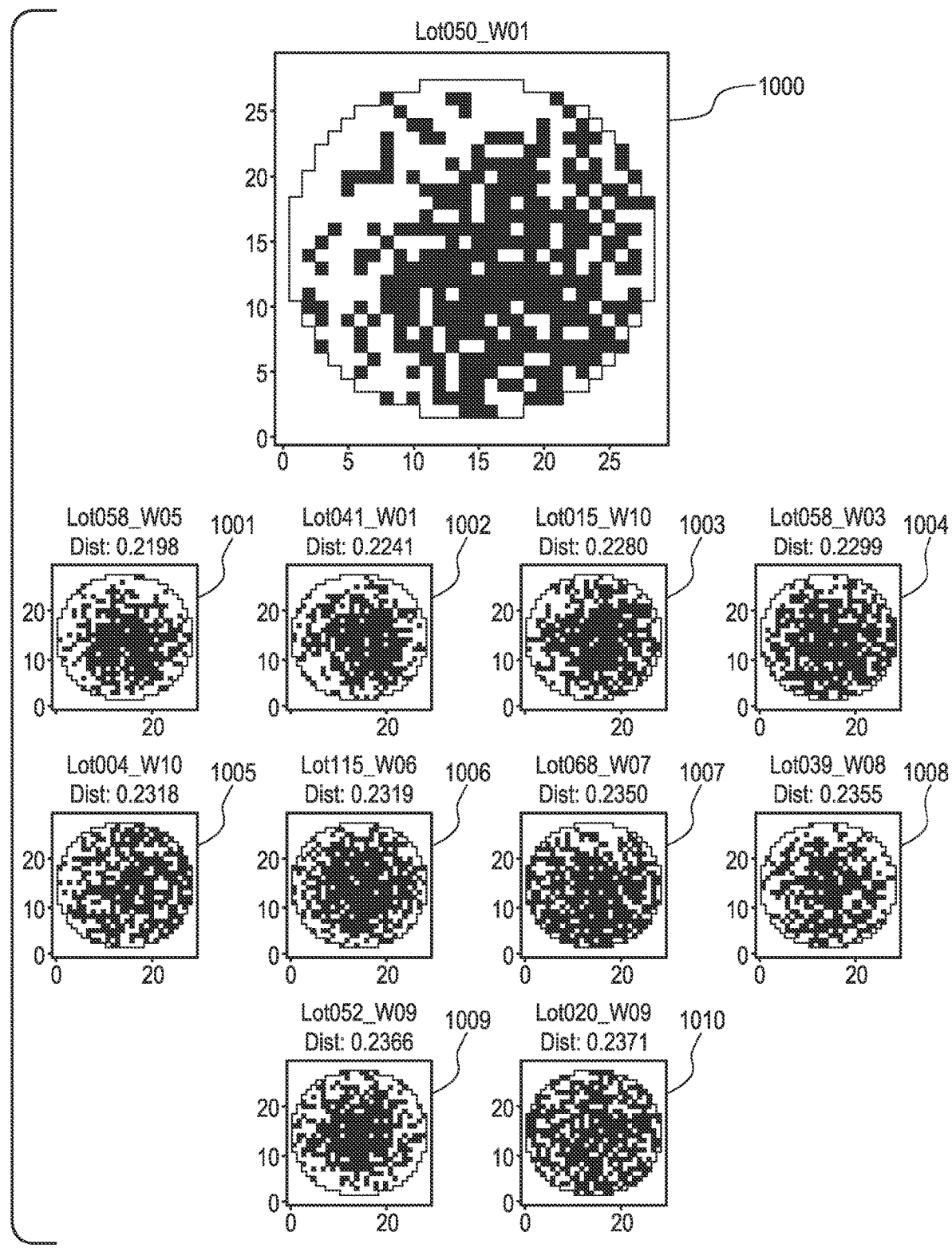

Yet another output form is viewing outliers to determine which incoming wafers do not have anything similar to prior wafers. By computing the distribution of a wafer to its nearest neighbors, wafers without any nearest neighbors can be determined. FIG. 9 shows an incoming wafer 900 and the ten closest matches 901-910 from the database. Although the bin map can be described as a high density pattern across the entire wafer, none of the closest matches is really that close. Similarly, FIG. 10 shows an incoming wafer 1000 and the ten closest matches 1001-1010 from the database. In this example, the top left of the bin map is bad and has propagated to the outer edge as well, but as in FIG. 9, there is no close match and therefore user input is likely needed in this example to make a better prediction in the future.

Figure 11:
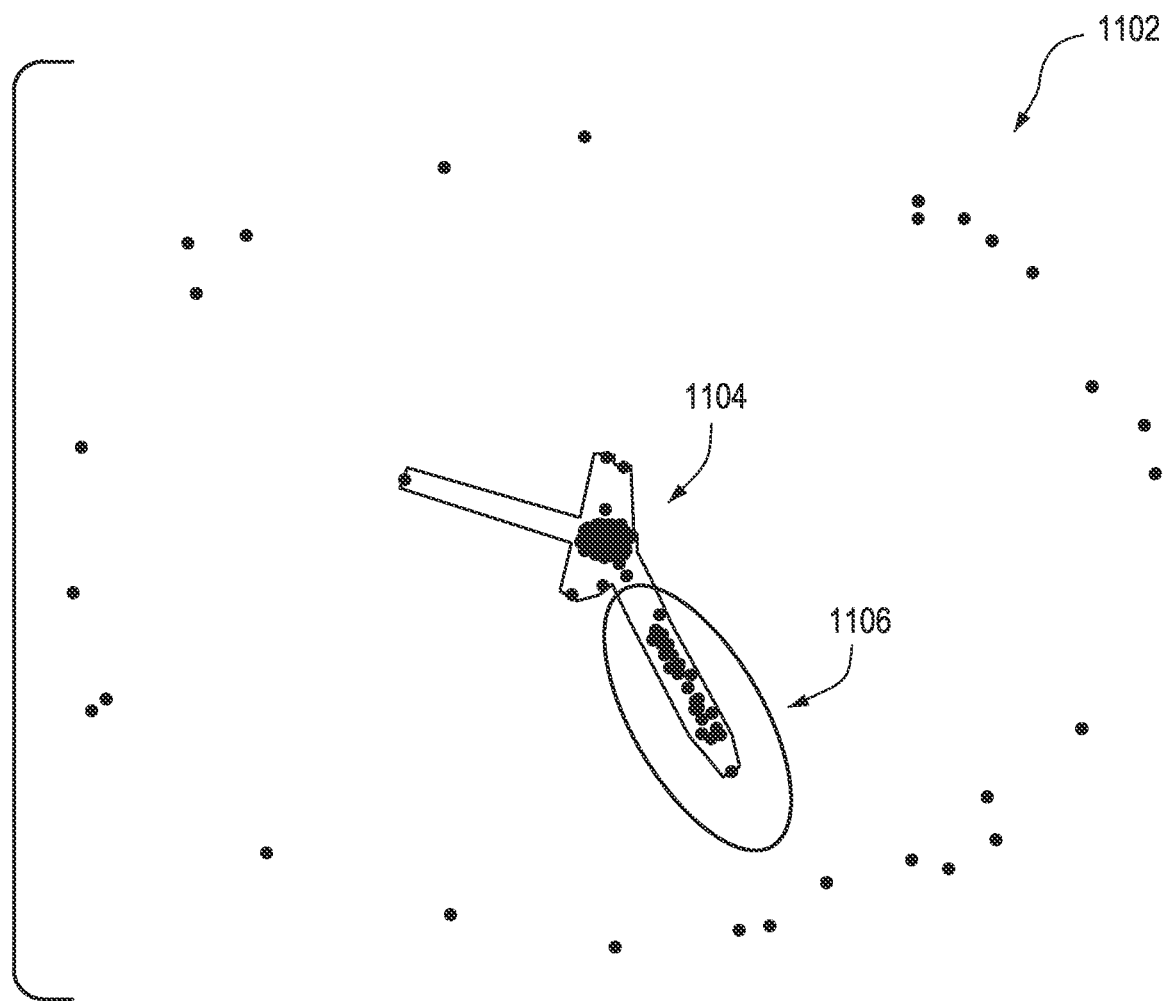
FIG. 11 is an example of an alternative representation of a network-type analysis of root cause based on a clustering analysis.

In another embodiment, by computing the wafer-to-wafer distances, the output could be represented as a network. Thus, network-based analytics could be used and combined with the WEH data to help identify the root cause of a wafer sample. FIG. 11 shows the output for viewing in the template based on a network analysis, with a top down view intended to illustrate which clusters of wafers are near each other. The point 1104 at the center of the graphical representation 1102 is the most tightly concentrated cluster and thus indicates the primary root cause. Extending away from the center are additional points 1106 that are not as tightly clustered and thus represent secondary root causes.

Figure 12:
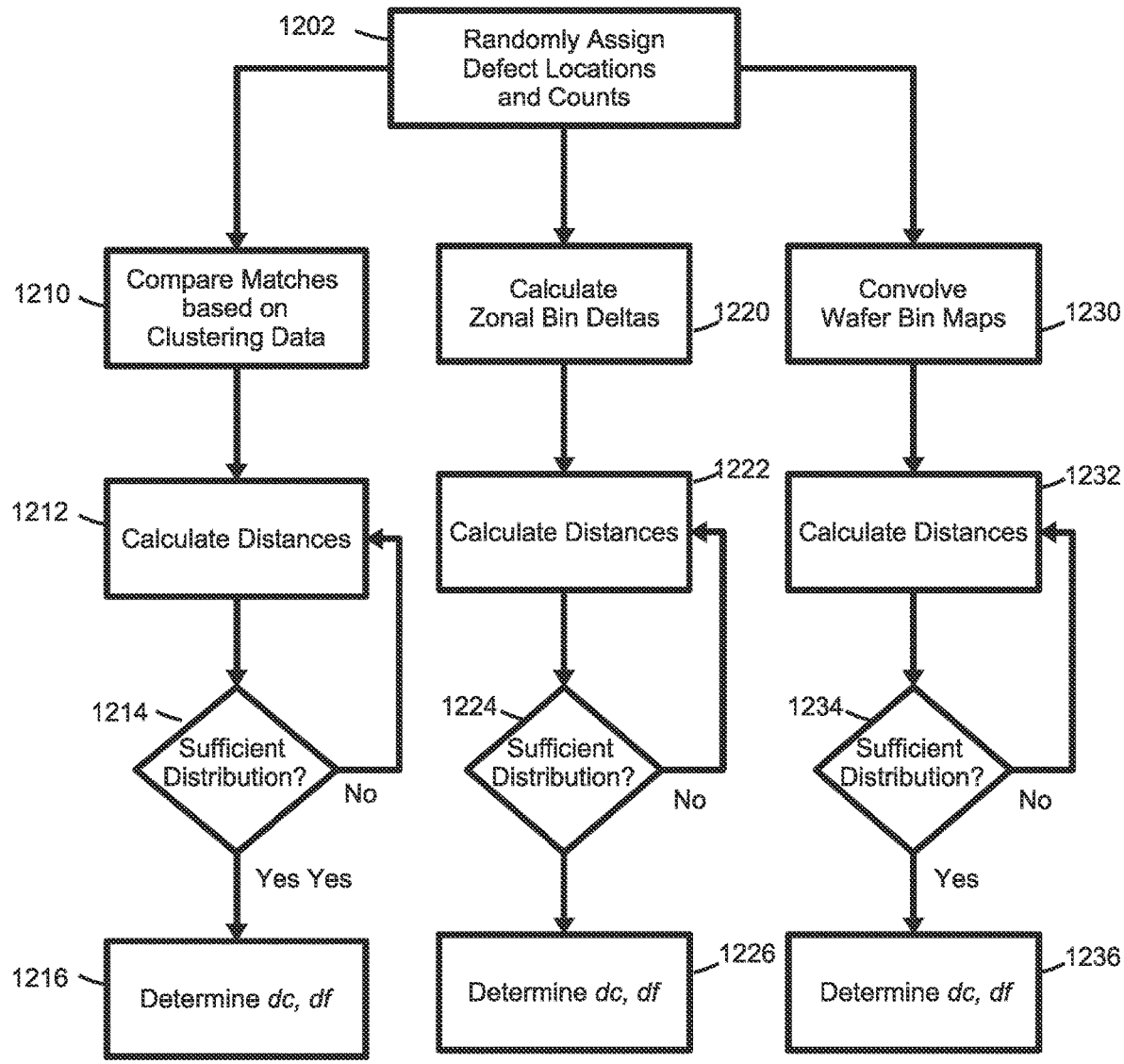
FIG. 12 is a flow chart illustrating an alternative process for determine parameter limits.

An alternative approach for automatically determining boundary conditions for random defects is illustrated by in FIG. 12 for each of the three different solution paths discussed previously. In step 1202, defect locations and counts are randomly assigned based on those found through clustering. Matches are compared in step 1210 based on the clustering data, and in step 1212, distances from the incoming wafer are calculated using two different methods, such as the Mahalanobis distance and the Euclidean distance. When enough distances have been calculated from moving the random locations to generate a statistical useful distribution in step 1214, then the parameters df and dc can be determined in step 1216 using the p-value threshold of the distribution; if not, more distances are calculated in step 1212 until there is sufficient data.

In the second solution path, zonal bin deltas are calculated in step 1220 from the randomly assigned locations. Then the differences in distances are calculated in step 1222 using three different methods. In step 1224, have enough distances been calculated to generate a statistical useful distribution? If so, then the parameters df and dc can be determined in step 1226 using the p-value threshold of the distribution; if not, more distances are calculated in step 1222 until there is sufficient data.

Instead of the summary datasets from clustering and zonal deltas, the third solution path takes wafer bin data from the dominant signal of the randomly assigned locations and convolves the wafer bin map data in step 1230 by running it through a machine learning model configured to determine a classification or bin for the subject wafer.

In step 1232, the distances from the incoming wafer are calculated using different methods, and this step is repeated until enough distances have been calculated from moving the random locations to generate a statistically useful distribution in step 1234. At that point, the parameters df and dc are determined in step 1236 using the p-value threshold of the distribution.

As noted earlier, a machine learning model is configured to implement any of the different solution paths on the basis of a convolutional algorithm. One example of an effective convolution is to use a blur matrix to smooth out the slight differences in locations of similar patterns.

The foregoing written description is intended to enable one of ordinary skill to make and use the techniques described herein, but those of ordinary skill will understand that the description is not limiting and will also appreciate the existence of variations, combinations, and equivalents of the specific embodiments, methods, and examples described herein.

The invention claimed is:

1. A method comprising:
   obtaining a first wafer bin map for a first semiconductor wafer manufactured in a current production run;
   identifying a product flow for the first semiconductor wafer;
   retrieving a plurality of prior wafer bin maps corresponding to prior production runs for semiconductor wafers manufactured using the identified product flow, and loading the plurality of prior wafer bin maps into a user interface;
   setting boundary conditions for a plurality of selected wafer parameters;
   comparing a first pattern on the first wafer bin map to a plurality of prior patterns respectively associated with the plurality of prior wafer bin maps in order to identify a subset of the plurality of prior wafer bin maps that have patterns similar to the first pattern of the first wafer bin map on the basis of the boundary conditions for the plurality of selected wafer parameters;
   determining a probability that a root cause associated with at least some of the subset of the plurality of prior wafer bin maps is a primary root cause for a defect associated with the first pattern on the first wafer bin map; and
   when the probability exceeds a threshold, assigning a label to the first wafer bin map indicating that the first root cause is the primary root cause.

2. The method of claim 1, further comprising:
   manually setting the boundary conditions for the selected wafer parameters via the user interface.

3. The method of claim 1, further comprising:
   automatically setting the boundary conditions for the selected wafer parameters.

4. The method of claim 3, further comprising:
   tuning the set of boundary conditions in order to identify a first number of neighboring wafers as the subset of prior wafer bin maps.

5. The method of claim 1, further comprising:
   determining a first statistical distance dc between the first semiconductor wafer and a plurality of neighboring wafers that is considered close enough to associate a root cause of the neighboring wafers with the first semiconductor wafer.

6. The method of claim 5, further comprising:
   determining a second statistical distance df between the first semiconductor wafer and the plurality of neighboring wafers that is considered too far away to associate the root cause.

7. The method of claim 1, the comparing step further comprising:
   determining a first statistical distance dc between the first semiconductor wafer and a plurality of neighboring wafers that is considered close enough to associate a root cause of the neighboring wafers with the first semiconductor wafer;
   determining a second statistical distance df between the first semiconductor wafer and the plurality of neighboring wafers that is considered too far away to associate the root cause of the neighboring wafers with the first semiconductor wafer;
   weighting a first number k of the plurality of neighboring wafers equally when all k neighboring wafers are within the distance dc;
   assigning the root cause of the k neighboring wafers to the first semiconductor wafer when all k neighboring wafers have the same root cause label; and
   assigning a plurality of root causes of the k neighboring wafers to the first semiconductor wafer in proportion to a frequency of occurrence when all k neighboring wafers do not have the same root cause label.

8. The method of claim 1, further comprising:
   retrieving a second plurality of prior wafer bin maps corresponding to prior production runs for semiconductor wafers manufactured using a similar product flow to the identified product flow; and
   scaling the retrieved wafer bin maps as necessary.

9. The method of claim 1, further comprising:
   displaying the first wafer bin map and at least some of the subset of prior wafer bin maps having patterns similar to the first wafer bin map on the user interface; and
   providing a first set of user controls to enable drilling down into additional wafer data for the first semiconductor wafer and the subset of semiconductor wafers manufactured in prior production runs.

10. The method of claim 9, further comprising:
    providing a second set of user controls to override and update a dominant root cause or secondary root causes associated with the first semiconductor wafer.

11. The method of claim 1, the comparing step further comprising:

evaluating possible matches for the first wafer bin map based on clustering of the prior patterns of the plurality of prior wafer bin maps;

generating a statistical distribution for a plurality of calculated distances between the first semiconductor wafer and a plurality of neighboring wafers based on the clustering;

determining a first statistical distance dc between the first semiconductor wafer and a plurality of neighboring wafers that is considered close enough to associate a root cause of the neighboring wafers with the first semiconductor wafer; and determining a second statistical distance df between the first semiconductor wafer and the plurality of neighboring wafers that is considered too far away to associate the root cause of the neighboring wafers with the first semiconductor wafer.

12. The method of claim 1, the comparing step further comprising:

calculating zonal bin deltas for the prior patterns of the plurality of prior wafer bin maps;

generating a statistical distribution for a plurality of calculated distances between the first semiconductor wafer and a plurality of neighboring wafers based on the zonal bin deltas;

determining a first statistical distance dc between the first semiconductor wafer and a plurality of neighboring wafers that is considered close enough to associate a root cause of the neighboring wafers with the first semiconductor wafer; and determining a second statistical distance df between the first semiconductor wafer and the plurality of neighboring wafers that is considered too far away to associate the root cause of the neighboring wafers with the first semiconductor wafer.

13. The method of claim 1, the comparing step further comprising:

convolving the prior patterns of the plurality of prior wafer bin maps;

generating a statistical distribution for a plurality of calculated distances between the first semiconductor wafer and a plurality of neighboring wafers based on the convolved patterns;

determining a first statistical distance dc between the first semiconductor wafer and a plurality of neighboring wafers that is considered close enough to associate a root cause of the neighboring wafers with the first semiconductor wafer; and determining a second statistical distance df between the first semiconductor wafer and the plurality of neighboring wafers that is considered too far away to associate the root cause of the neighboring wafers with the first semiconductor wafer.

14. A method comprising:

receiving a first wafer bin map for a first semiconductor wafer manufactured in a current production run;

retrieving a plurality of prior wafer bin maps corresponding to prior production runs for semiconductor wafers;

computing a plurality of statistical distances between respective ones of the prior wafer bin maps and the first wafer bin map;

assigning a single root cause to the first wafer bin map when each one of a subset of the plurality of prior wafer bin maps has a computed statistical distance less than a threshold and each one of the subset has the single root cause; and assigning a plurality of root causes to the first wafer bin map when each one of the subset has a computed statistical distance less than the threshold but each one of the subset does not have the first root cause, each of the plurality of root causes being assigned as a function of the computed statistical distance between respective ones of the prior wafer bin maps and the first wafer bin map.

15. The method of claim 14, further comprising, prior to computing the statistical distances, clustering the prior wafer bin maps.

16. The method of claim 14, further comprising, prior to computing the statistical distances, calculating zonal bin deltas for the prior wafer bin maps.

17. The method of claim 14, further comprising, prior to computing the statistical distances, convolving the prior wafer bin maps.

18. The method of claim 14, further comprising:

identifying a first product flow for the first semiconductor wafer; and retrieving the plurality of prior wafer bin maps corresponding to prior production runs having the first product flow.

19. The method of claim 14, further comprising:

identifying a first product flow for the first semiconductor wafer; and retrieving the plurality of prior wafer bin maps corresponding to prior production runs having a product flow similar to the first product flow.

20. The method of claim 14, further comprising:

setting wafer limits for a plurality of selected wafer parameters;

comparing the first wafer bin map to the plurality of prior wafer bin maps in order to identify a first group of the plurality of prior wafer bin maps that are similar to the first wafer bin map on the basis of the wafer limits; and computing the plurality of statistical distances between the first group of the prior wafer bin maps and the first wafer bin map.

* * * * *